United States Patent [19]
Takei et al.

[11] Patent Number: 4,930,296
[45] Date of Patent: Jun. 5, 1990

[54] FRONT MOWER

[75] Inventors: Terutaka Takei; Shigeru Morita; Yoshikazu Togoshi; Yoshihiro Kawahara, all of Osaka, Japan

[73] Assignee: Kubota Ltd., Osaka, Japan

[21] Appl. No.: 405,795

[22] Filed: Sep. 11, 1989

[30] Foreign Application Priority Data

Jan. 31, 1989 [JP] Japan ................................ 1-11093[U]

[51] Int. Cl.⁵ .......................................... A01D 69/00
[52] U.S. Cl. .................................................... 56/11.3
[58] Field of Search ...................... 56/11.3, 10.8, 10.1, 56/11.1, 13.5, 16.7; 180/70.1

[56] References Cited

U.S. PATENT DOCUMENTS 3,540,028 11/1970 Love ................................ 56/11.1 X
4,159,613 7/1979 Knudson et al. .................... 56/11.3
4,327,544 5/1982 McDuffie et al. ................ 56/11.1 X
4,513,834 4/1985 Hayashi et al. ..................... 180/70.1
4,813,215 3/1989 Chase et al. ...................... 56/11.3 X Primary Examiner—Thuy M. Bui
Attorney, Agent, or Firm—Jordan and Hamburg

[57] ABSTRACT

A four wheel drive front mower having a grass cutting unit connected to the front of a vehicle body. This mower comprises a hydrostatic transmission, an auxiliary change speed gearing, and a propelling drive transmission. The propelling drive transmission includes a center differential for distributing output of the auxiliary change speed device to front wheels and rear wheels, a clutch for making and breaking drive transmission from the center differential to the front wheels, and a front differential for transmitting the drive from the clutch to right and left front axles. The center differential, clutch and front differential are arranged vertically and serially.

8 Claims, 6 Drawing Sheets

FRONT MOWER

BACKGROUND OF THE INVENTION

1. Field of the Invention

The present invention relates to a front wheel drive or four wheel drive working vehicle carrying a working implement, in particular a grass cutting unit, at the front of a vehicle body.

2. Description of the Prior Art

A known working vehicle of the above-noted type, e.g. a front mower, comprises a stepless change speed device disposed laterally of an engine, and a propelling drive transmission disposed forwardly of the change speed device. Output of the engine is transmitted through the change speed device to the transmission. Such a working vehicle is invented by ourselves and disclosed in Japanese Utility Model Application filed Aug. 3, 1988.

In the above working vehicle, the vehicle body per se has a large width to provide a large transverse space for accommodating the transversely arranged engine and change speed device. Consequently, depending on the size of the grass cutting unit connected to the very front of the vehicle body, the grass cutting unit may lie within the width of the vehicle body instead of projecting laterally thereof. It is then difficult to carry out a grass cutting operation adjacent a wall or a tree.

Alternatively, the engine, stepless change speed device and transmission may simply be arranged serially in the fore and aft direction of the vehicle body in order to avoid the large width of the vehicle body. In this case, however, the vehicle body has increased longitudinal dimensions, inter alia an increased wheelbase, resulting in disadvantages in the turning radius and the like. This poses a very serious problem particularly where an auxiliary change speed device is added for realizing an increased change speed range.

SUMMARY OF THE INVENTION

An object of the present invention is provide an improved working vehicle which allows the vehicle body to have a reduced width without increasing its longitudinal dimensions, and yet realizes a large change speed range.

The above object is achieved, according to the present invention, by a vehicle comprising an engine, a stepless change speed device disposed forwardly of the engine with respect to a fore and aft direction of a vehicle body for receiving drive from the engine, an auxiliary change speed device disposed forwardly of the stepless change speed device for changing speed of the drive output from the stepless change speed device, and a propelling drive transmission for receiving an output of the auxiliary change speed device, the propelling drive transmission including a front differential disposed in a region below the auxiliary change speed device.

In the above construction, the engine, stepless change speed device and propelling drive transmission are arranged longitudinally of the vehicle body, while the auxiliary change speed device and front differential are arranged vertically. This arrangement realizes a short wheelbase while minimizing the space transversely of the vehicle body required for accommodating the engine, stepless change speed device, auxiliary change speed device and differential. Thus, the vehicle body has relatively small transverse and longitudinal dimensions although the auxiliary change speed device is provided between the stepless change speed device and differential for increasing the change speed range.

Since such arrangement minimizes the transverse and longitudinal dimensions of the vehicle body, even a relatively small working implement such as a small grass cutting unit extends a significant amount laterally outwardly of the vehicle body. This facilitates a grass cutting operation adjacent a wall or a tree. Furthermore, since the foregoing arrangement does not involve an elongation of the wheelbase, the working vehicle of this invention has excellent maneuverability.

The object of the present invention is achieved in a streamlined manner by a vehicle comprising a first housing containing a stepless change speed device disposed forwardly of an engine with respect to a fore and aft direction of the vehicle body, a second housing disposed forwardly of the first housing and containing an auxiliary change speed device, and a third housing disposed forwardly of the second housing and containing a propelling drive transmission, wherein these housings are formed integrally to extend in the fore and aft direction of the vehicle body, the third housing including a bulging portion located in a region below the second housing, the bulging portion containing a front differential.

The foregoing and other objects, features and advantages of the invention will be apparent from the following more particular description of a preferred embodiment of the invention, as illustrated in the accompanying drawings.

BRIEF DESCRIPTION OF THE DRAWINGS

The drawings show a lawn mower having a vehicle body structure according to the present invention, in which.

DESCRIPTION OF THE PREFERRED EMBODIMENT

Figure 1:
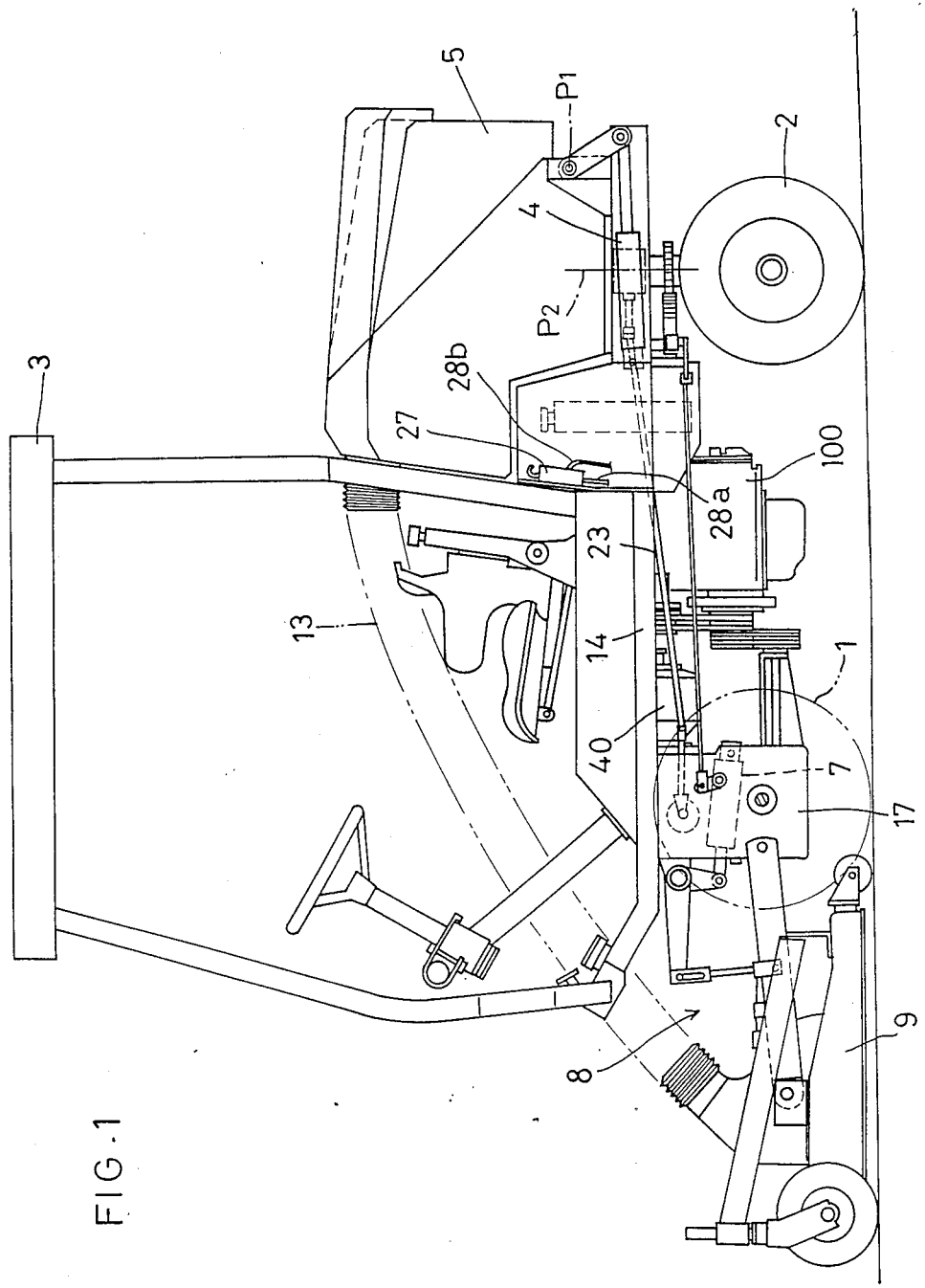
FIG. 1 is a side elevation, partly broken away, of the lawn mower.
Figure 2:
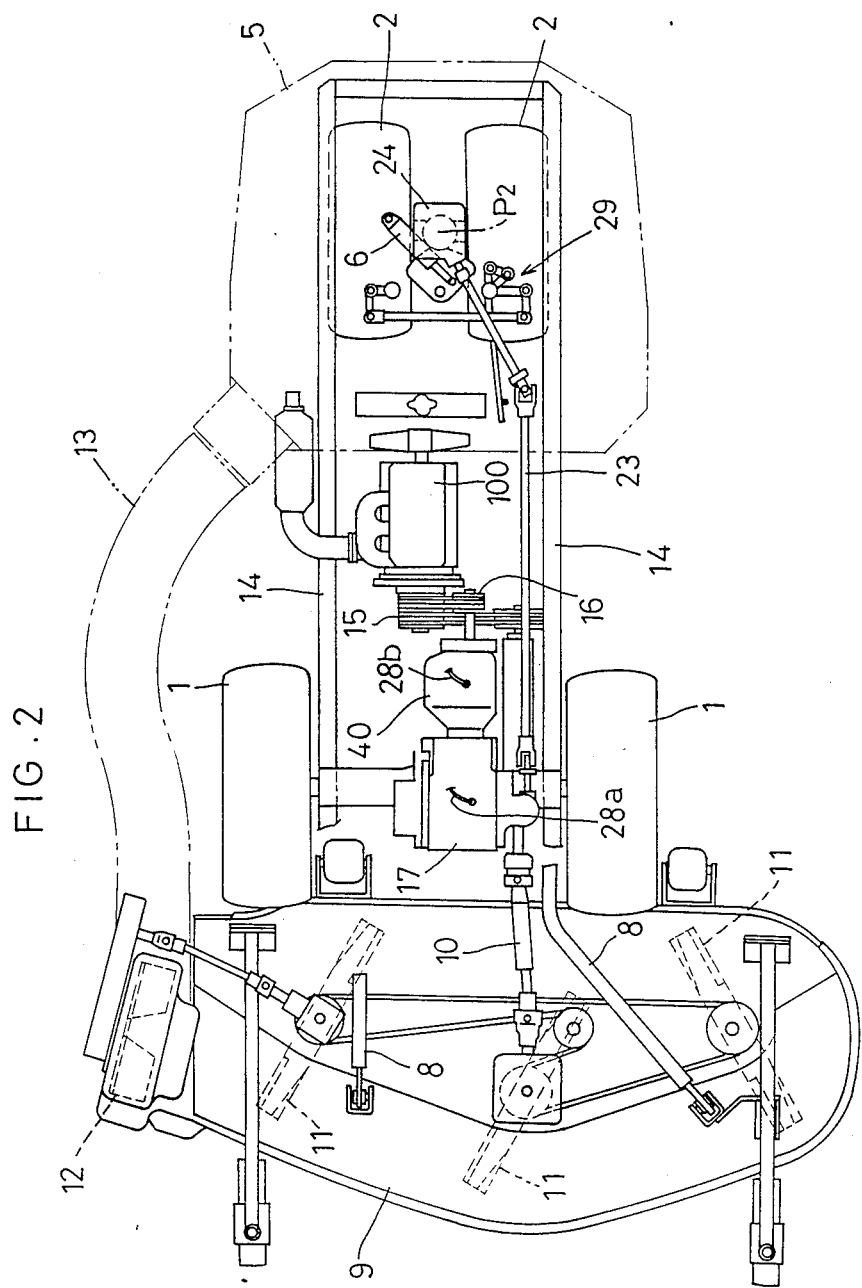
FIG. 2 is a schematic plan view of the lawn mower.

Referring to FIGS. 1 and 2, a riding type lawn mower is shown in comprising front drive wheels 1, rear drive wheels 2, a canopy 3, and a grass catcher 5 which is pivotable on an axis P1 by a dump cylinder 4. The rear wheels 2 are steerable on an axis P2 by a steering cylinder 6. A grass cutting unit 9 is connected to the front of a vehicle body through a link mechanism 8 which is vertically pivotable by a lift cylinder 7. A rotary shaft 10 extends from the vehicle body for driving cutting blades 11 and a rotary fan 12. Grass clippings are delivered to the grass catcher 5 through a conveyer duct 13 as entrained on air flows generated by the rotary fan 12.

As shown in FIG. 2, an engine 100 is disposed between the front and rear wheels and secured through rubber cushions (not shown) to a pair of right and left main frames 14 extending longitudinally of the vehicle body. The vehicle body further includes a propelling drive transmission 17, and a change speed device or hydrostatic stepless transmission 40 disposed between the engine 100 and propelling drive transmission 17.

Figure 4:
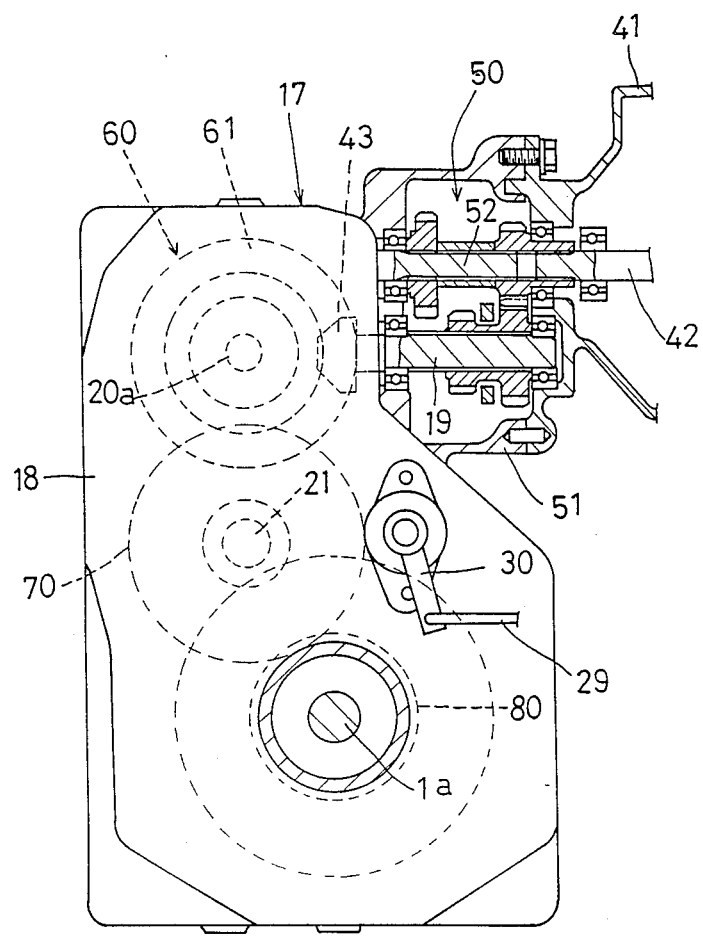
FIG. 4 is a side view, partly broken away, of the transmission.

The hydrostatic transmission 40 is housed in a case 41 which is supported by a case 18 of the propelling drive transmission 17, by being directly attached to a case 51 of an auxiliary change speed device 50 formed as part of the propelling drive transmission case 18 (FIG. 4). The hydrostatic transmission 40 receives engine output through a transmission belt 16 wound on an output pulley 15 of the engine 100, and transmits the output to the auxiliary change speed device 50 disposed upstream of the propelling drive transmission 17.

Figure 3:
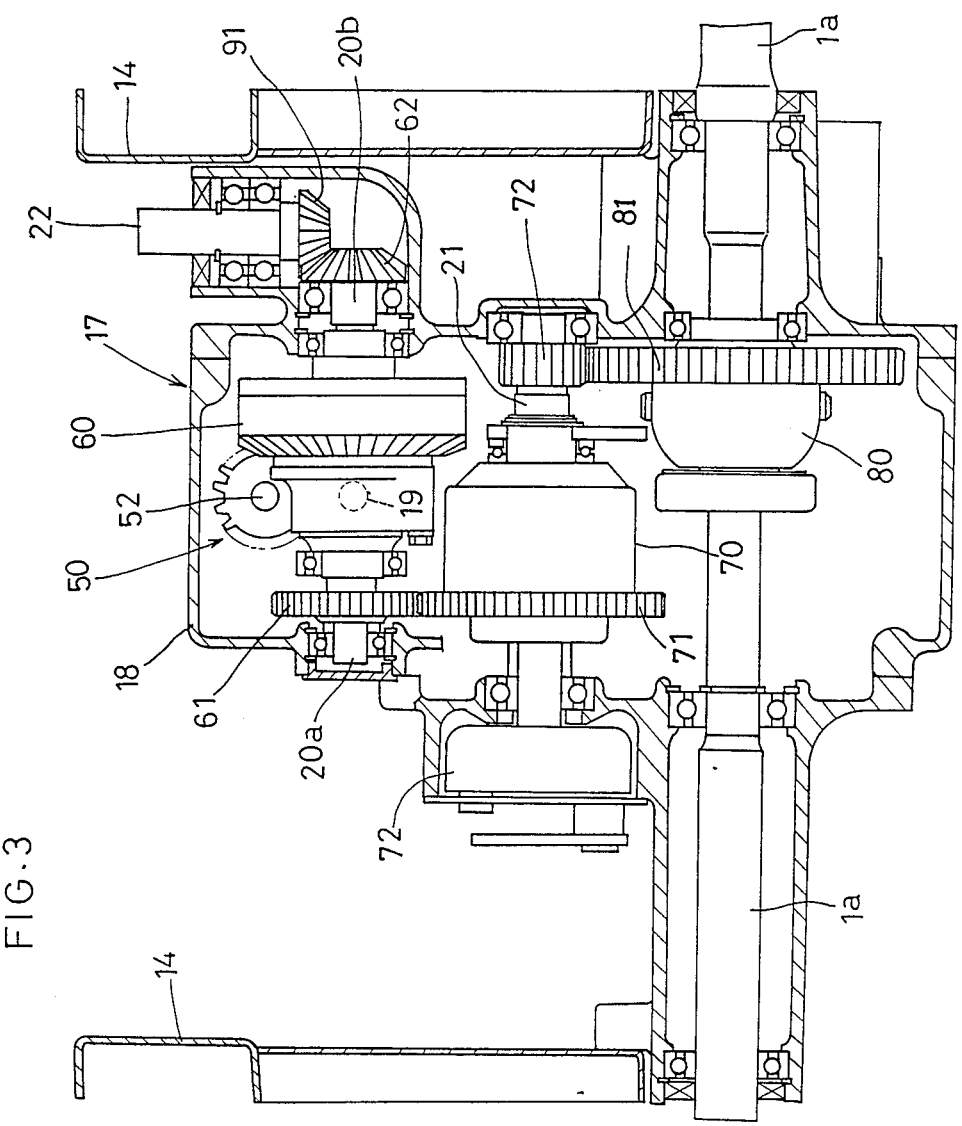
FIG. 3 is a partly developed sectional view of a propelling drive transmission.
Figure 5:
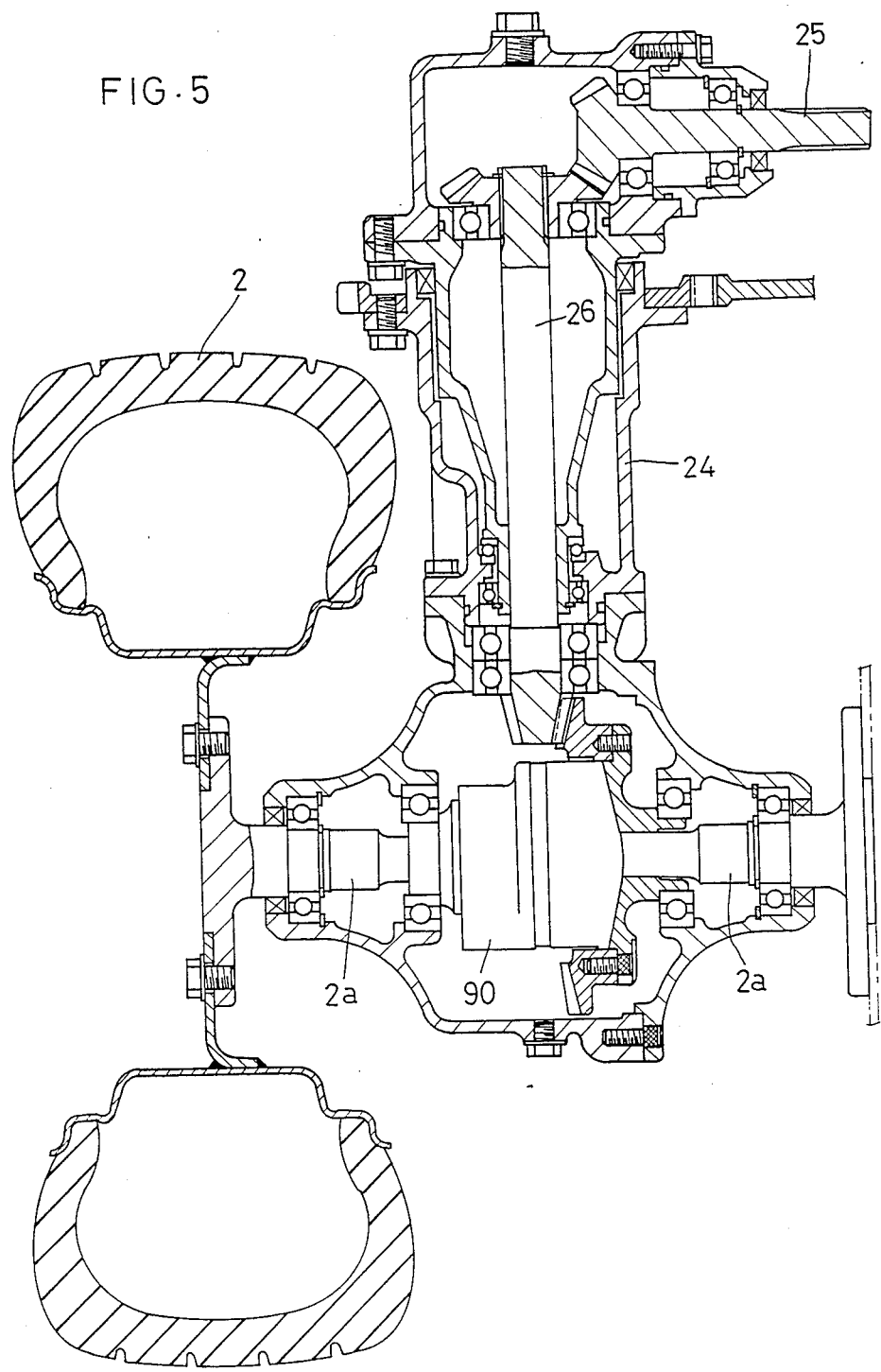
FIG. 5 is a sectional view of a rear wheel gear case.

Referring to FIGS. 3 and 4, the auxiliary change speed device 50 is a gear type device including an input shaft 52 connected to an output shaft 42 of the hydrostatic transmission 40. The auxiliary change speed device 50 also includes an output shaft 19 connected through bevel gears 43 and 61 to a center no-spin differential 60 housed in the propelling drive transmission case 18. The transmission case 18 further includes a front wheel drive multidisk clutch 70 connected through gears 61 and 71 to a front wheel drive output shaft 20a of the center differential 60, a front differential 80 connected to an output shaft 21 of the front wheel drive clutch 70, and a rear wheel driving power takeoff shaft 22 connected through bevel gears 62 and 91 to a rear wheel drive output shaft 20b of the center differential 60. The front differential 80 is directly connected to right and left front axles 1a. The rear wheel driving power takeoff shaft 22 is operatively connected to right and left rear axles 2a through a transmission shaft 23 having universal joints, an input shaft 25 and a transmission shaft 26 in a rear wheel transmission case 24 as shown in FIG. 5, and a rear no-spin differential 90. In FIG. 3, the rear wheel driving power takeoff shaft 22 and bevel gear 91 are shown as turned 90 degrees for the purpose of illustration. Of course, the power takeoff shaft 22 actually extends perpendicular to the sheet of FIG. 3.

Figure 6:
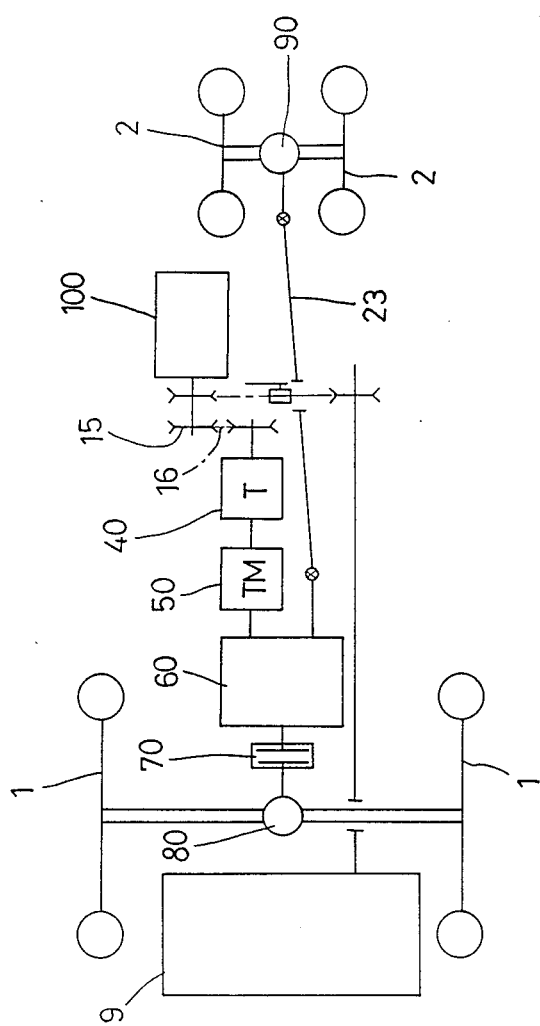
FIG. 6 is a diagram of a drive transmission system.

FIG. 6 schematically shows a drive transmitting system of the lawn mower. As seen the output of the engine 100 is transmitted through the hydrostatic transmission 40 and auxiliary change speed device 50 to the center differential 60 where the drive is divided for transmission to the front wheels 1 and to the rear wheels 2. Thus, part of the drive is transmitted from the center differential 60 to the front wheels 1 through the front wheel drive clutch 70, which makes or breaks the drive transmission, and the front differential 80 which may transmit the drive at different rates to the right and left front wheels 1. The other part of the drive is transmitted through the rear differential 90, at different rates as necessary, to the right and left rear wheels 2. The hydrostatic transmission 40 carries out a main, stepless change speed operation, while the auxiliary change speed device 50 changes the output of the hydrostatic transmission 40 into two, high and low, speeds.

As shown in FIGS. 3 and 4, the front differential 80 is disposed below the auxiliary change speed device 50. This vertical arrangement is effective to avoid an increase in the longitudinal dimensions of the vehicle body, and the wheelbase in particular, with the auxiliary change speed device 50 serving to realize an increased change speed range.

The engine output is also transmitted to the rotary shaft 10 for grass cutting unit 9 through an intermediate shaft extending laterally along and below the hydrostatic transmission 40, the auxiliary change speed device 50 and the front differential 80.

Reverting to FIG. 1, the vehicle body carries a breather box 27 for allowing the transmission case 18 and hydrostatic transmission 40 to draw and discharge air through suction and exhaust pipes 28a and 28b. The breather box 27 is disposed at a high position to avoid oil efflux due to tilting of the vehicle body.

FIG. 2 includes a link mechanism 29 for transmitting an operating force of the steering cylinder 6 to a device 30 (FIG. 4) for operating the front wheel drive clutch 70. This construction automatically disengages the clutch 70 when the rear wheels 2 are steered to a predetermined angle. Further, FIG. 3 shows a brake 72 for braking the front wheels 1 through the output shaft 21 of the front wheel drive clutch 70.

In the described embodiment, the hydrostatic transmission 40 is employed as the stepless change speed device. Alternatively, this change speed device may comprise a mechanical device including a taper cone or frictional transmission ring.

We claim:

1. A vehicle having a working implement connected to the front of a vehicle body, comprising;
   an engine,
   a stepless change speed device disposed forwardly of said engine with respect to a fore and aft direction of the vehicle body for receiving drive from said engine,
   an auxiliary change speed device disposed forwardly of said stepless change speed device for changing speed of the drive output from said stepless change speed device, and
   a propelling drive transmission for receiving an output of said auxiliary change speed device, said propelling drive transmission including a front differential disposed in a region below said auxiliary change speed device.

2. A vehicle as claimed in claim 1, wherein said propelling drive transmission further includes a center differential for distributing the output of said auxiliary change speed device to front wheels and rear wheels, the drive being transmitted to the rear wheels through a relay shaft extending laterally along said auxiliary change speed device, said stepless change speed device and said engine.

3. A vehicle as claimed in claim 2, wherein said propelling drive transmission further includes clutch means for making and breaking drive transmission from said center differential to said front wheels, said center differential, said clutch means and said front differential being arranged vertically and serially.

4. A vehicle as claimed in claim 1, wherein said stepless change speed device comprises a hydrostatic transmission.

5. A vehicle as claimed in claim 1, further comprising a transmission shaft extending laterally along said stepless change speed device, said auxiliary change speed device and said front differential for transmitting drive from said engine to said working implement.

6. A vehicle as claimed in claim 1, wherein said working implement comprises a grass cutting unit.

7. A four wheel drive front mower having a grass cutting unit connected to the front of a vehicle body, comprising;
   an engine,
   a stepless change speed device disposed forwardly of said engine with respect to a fore and aft direction of the vehicle body for receiving drive from said engine, an auxiliary change speed device disposed forwardly of said stepless change speed device for changing speed of the drive output from said stepless change speed device, and a propelling drive transmission for receiving an output of said auxiliary change speed device, said propelling drive transmission including a center differential for distributing the output of said auxiliary change speed device to front wheels and rear wheels, said center differential including a front wheel driving output shaft and a rear wheel driving output shaft extending rightward and leftward with respect to the fore and aft direction of the vehicle body, clutch means for making and breaking drive transmission from said center differential to said front wheels, said clutch means including a clutch output shaft extending transversely of the vehicle body, and a front differential for transmitting the drive from said clutch output shaft to right and left front axles, wherein said front wheel driving output shaft, said clutch output shaft and said front axles are arranged vertically and serially, said front axles being displaced rearwardly of the vehicle body to be located in a region below said auxiliary change speed device.

8. A front mower having a grass cutting unit connected to the front of a vehicle body, comprising;

an engine, a first housing containing a stepless change speed device disposed forwardly of said engine with respect to a fore and aft direction of the vehicle body, a second housing disposed forwardly of said first housing and containing an auxiliary change speed device, and a third housing disposed forwardly of said second housing and containing a propelling drive transmission, wherein said first, second and third housings are formed integrally to extend in the fore and aft direction of the vehicle body, said third housing including a bulging portion located in a region below said second housing, said bulging portion containing a front differential.

* * * * *